United States Patent
Li et al.

(10) Patent No.: US 12,425,518 B2
(45) Date of Patent: *Sep. 23, 2025

(54) REQUEST ROUTING BASED ON CONTACT CENTER ENGAGEMENT HISTORY

(71) Applicant: Zoom Communications, Inc., San Jose, CA (US)

(72) Inventors: Jin Li, Los Gatos, CA (US); Xu Hua Li, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,398

(22) Filed: Dec. 14, 2023

(65) Prior Publication Data

US 2024/0121340 A1 Apr. 11, 2024

Related U.S. Application Data

(63) Continuation of application No. 17/587,622, filed on Jan. 28, 2022, now Pat. No. 11,882,241.

(51) Int. Cl.
*H04M 3/523* (2006.01)
*H04M 3/51* (2006.01)

(52) U.S. Cl.
CPC ....... *H04M 3/5232* (2013.01); *H04M 3/5183* (2013.01)

(58) Field of Classification Search
CPC .......................... H04M 3/5232; H04M 3/5183
USPC ............. 379/266.01, 265.11, 266.02, 265.05
See application file for complete search history.

(56) References Cited

U.S. PATENT DOCUMENTS

| | | |
|---|---|---|
| 7,212,624 B2 | 5/2007 | O'Connor et al. |
| 8,634,537 B2 | 1/2014 | Hollatz et al. |
| 8,873,737 B2 | 10/2014 | Moran et al. |
| 9,392,115 B2 | 7/2016 | Ristock et al. |
| 9,628,623 B2 | 4/2017 | Vymenets et al. |
| 9,912,812 B2 | 3/2018 | Vymenets et al. |

(Continued)

FOREIGN PATENT DOCUMENTS

CN 111935363 A 11/2020

OTHER PUBLICATIONS

International Search Report and Written Opinion mailed on May 12, 2023 in corresponding PCT Application No. PCT/US2023/011369.

*Primary Examiner* — Thjuan K Addy
(74) *Attorney, Agent, or Firm* — Young Basile Hanlon & MacFarlane, P.C.

(57) ABSTRACT

A contact center system uses user profiles and agent profiles to determine a routing for a contact center engagement request from a user device to an agent device. Responsive to the contact center engagement request, a user profile associated with the user device is accessed to determine a prioritization score. The prioritization score can be determined in some cases using both information associated with the user profile and input obtained from the user device. Agent profiles are accessed to determine an agent to support the contact center engagement request based on the prioritization score. Each of the agent profiles corresponds to a different contact center agent or agent group. The determined agent may be selected from amongst a plurality of candidates identified based on the profile evaluation. A private session is then established between the user device and a device of the agent.

20 Claims, 8 Drawing Sheets

(56) References Cited

U.S. PATENT DOCUMENTS

| | | | |
|---|---|---|---|
| 10,194,028 B2 | 1/2019 | Vymenets et al. | |
| 10,631,257 B1 | 4/2020 | Serero et al. | |
| 10,742,816 B2 | 8/2020 | Kelly et al. | |
| 10,827,074 B2 | 11/2020 | Krimstock et al. | |
| 10,931,825 B2 | 2/2021 | Revanur et al. | |
| 11,611,653 B1 | 3/2023 | Porter et al. | |
| 11,954,443 B1 * | 4/2024 | Kumar | G06N 20/00 |
| 2002/0143661 A1 | 10/2002 | Tumulty et al. | |
| 2004/0101127 A1 | 5/2004 | Dezonno et al. | |
| 2022/0400091 A1 | 12/2022 | Wyss et al. | |

* cited by examiner

REQUEST ROUTING BASED ON CONTACT CENTER ENGAGEMENT HISTORY

CROSS-REFERENCE TO RELATED APPLICATION(S)

This application is a continuation of U.S. patent application Ser. No. 17/587,622, filed Jan. 28, 2022, the entire disclosure of which is hereby incorporated by reference.

FIELD

This disclosure generally relates to routing a contact center request from a user device to an agent device based on contact center user and agent profiles.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
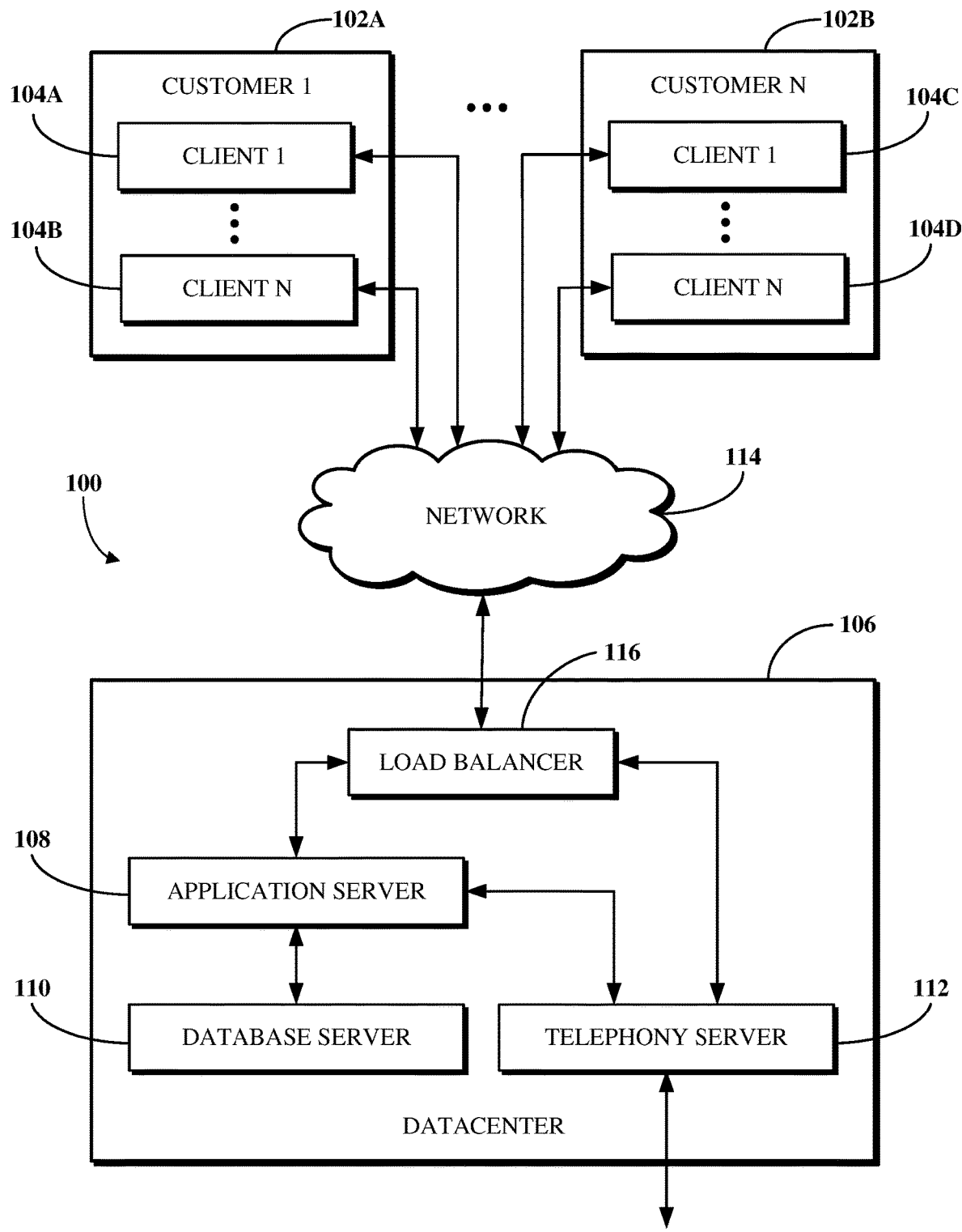
FIG. 1 is a block diagram of an example of an electronic computing and communications system.

The use of contact centers by or for service providers is becoming increasingly common to address customer support requests over various modalities, including telephony, video, text messaging, chat, and social media. In one example, a contact center may be implemented by an operator of a software platform, such as a unified communications as a service (UCaaS) platform, for a customer of the operator. Users of the customer may engage with the contact center to address support requests over one or more communication modalities enabled for use with the contact center by the software platform. In another example, the operator of such a software platform may implement a contact center to address customer support requests related to the software platform itself.

A request for customer support via a contact center, also referred to as a contact center request, can be based on any of a variety of reasons. In some examples, a contact center request may be to ask relatively basic service-related questions. In other examples, a contact center request may focus on a nuanced issue specific to the contact center user. In some cases, all contact center agents of a given contact center may be deployed to address all categories of contact center requests. Typically, however, a contact center will deploy agents into groups (e.g., agent groups) defined to cover specific categories of contact center requests. In such a typical case, a routing system is used to direct contact center requests to the proper contact center agent.

Conventional contact center routing rely upon information provided by contact center users as requests are processed by a contact center system. For example, over the telephony modality, a contact center system may present an interactive voice response (IVR) menu for the contact center user to navigate. Responses to the IVR menu prompts input by the contact center user are used to direct a request from the contact center user to the proper contact center agent. While this approach may ultimately direct a request to the correct agent, it suffers from several drawbacks.

First, the accuracy of the routing is entirely dependent upon the correct processing of the IVR menu by the contact center user. In many cases, a user may misunderstand one or more prompts or misinterpret an irrelevant prompt option as corresponding to their request. Second, it generally fails to consider contact center engagement histories for the contact center user, which may offer valuable insights for directing requests. In some cases, a contact center system may offer a contact center user a tracking identifier (e.g., a service request number) usable to uniquely identify a given request during future engagements. However, the user during such a future engagement must still navigate through an IVR or like process to be routed to a contact center agent before the user can provide the tracking identifier. In many cases, the contact center agent, upon reviewing records based on the tracking identifier, will determine that a different agent is better suited to address a request. This results in increased wait times for the user and may leave the user with negative feelings in view of time unnecessarily wasted by the initial routing to the first contact center agent.

Some contact center users may have minimal engagement with a contact center, such as via a single contact center request over some period of time. Other contact center users may engage the contact center more frequently. Relatedly, some contact center users have to wait in queues longer than others, some contact center users have fewer requests resolved in a single engagement than others, and some contact center users may have different priority statuses than others (e.g., very important person (VIP) status). As such, contact center users generally have different histories with respect to their engagements of a contact center. Accordingly, the failure of conventional contact center routing to consider user histories and other relevant user information as part of the routing process adds strain on both the users by imposing additional and in some cases repeated wait times and on the contact center system itself by duplicitously deploying contact center agents to a given request and tying up system resources in the one or more occurrences of re-routing.

Implementations of this disclosure address problems such as these via a contact center system which uses user profiles and agent profiles to determine a routing for a contact center engagement request from a user device to an agent device. Responsive to the contact center engagement request, a user profile associated with the user device is accessed to determine a prioritization score. The prioritization score can be determined in some cases using both information associated with the user profile and input obtained from the user device. Agent profiles are accessed to determine an agent to support the contact center engagement request based on the prioritization score. Each of the agent profiles corresponds to a different contact center agent or agent group. The determined agent may be selected from amongst a plurality of candidates identified based on the profile evaluation. A private session is then established between the user device and a device of the agent.

To describe some implementations in greater detail, reference is first made to examples of hardware and software structures used to implement a system for profile-based contact center request routing. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a SIP zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
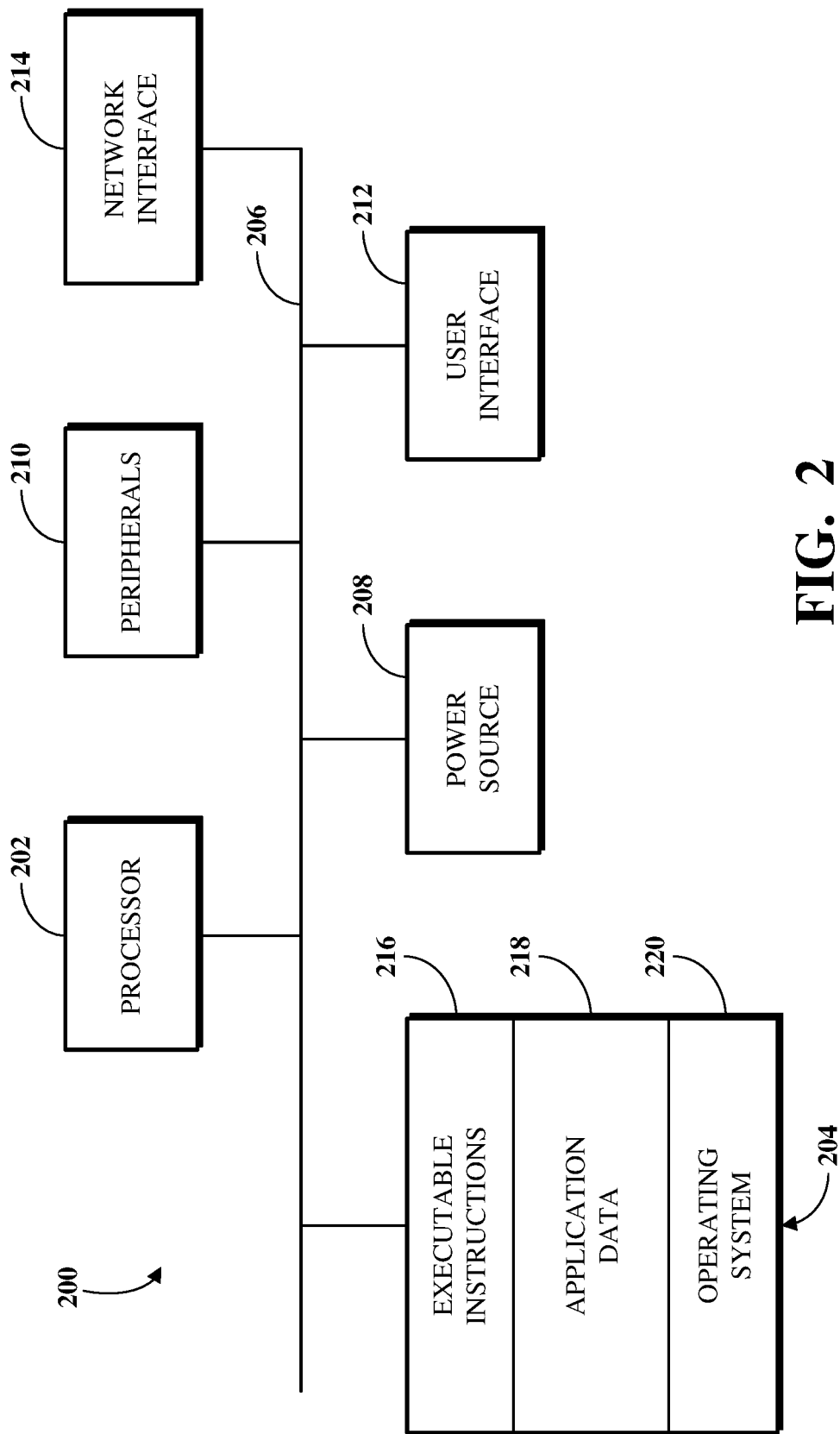
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
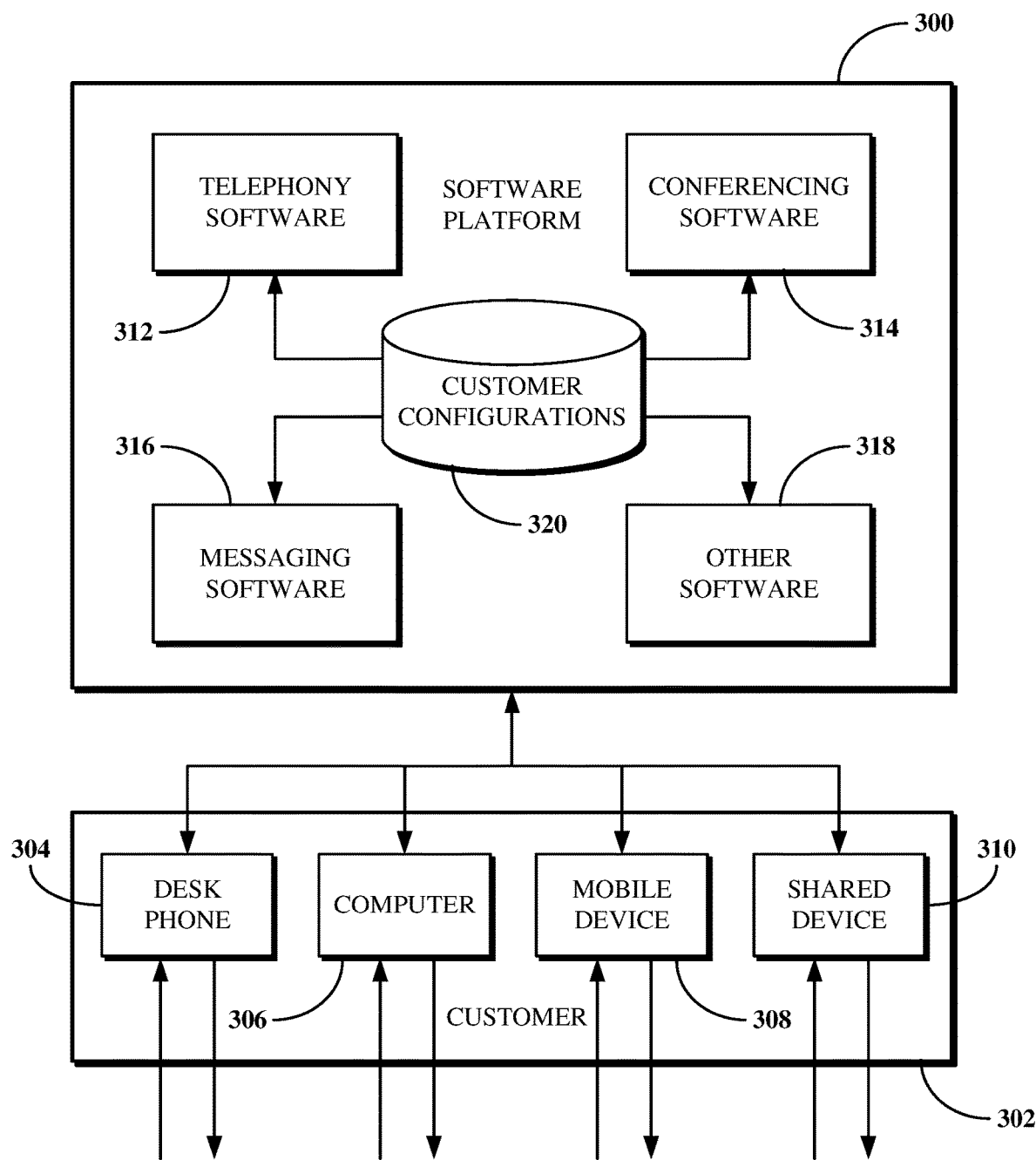
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for use with a contact center system, for example, for profile-based contact center request routing.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
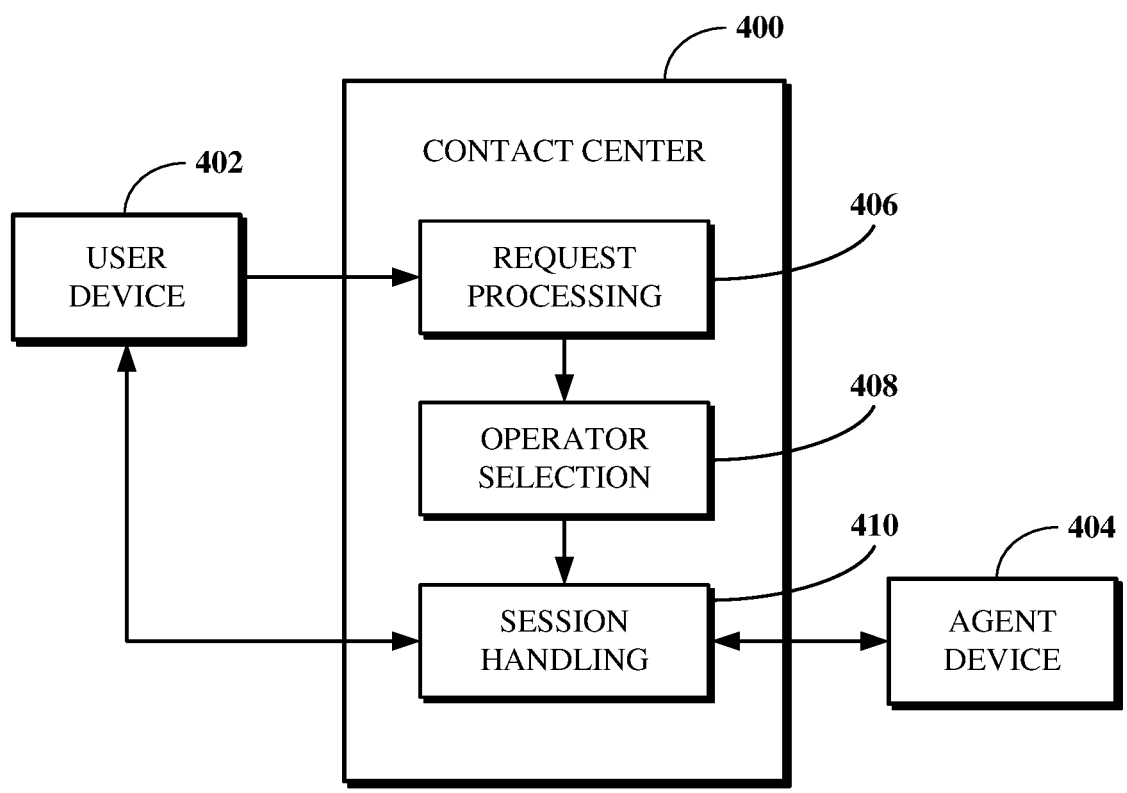
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center engagements requested by user devices such as the user device 402. As shown, the software includes request processing software 406, agent selection software 408, and session handling software 410.

The request processing software 406 processes a request for a contact center engagement initiated by the user device 402 to determine information associated with the request. The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an IVR menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request via text and thereafter process the text entered by the user device 402 using natural language processing and/or other processing.

The agent selection software 408 uses output of the request processing software 406 including the information associated with the request to select a contact center agent to handle the request. The contact center agent may be a human agent or a non-human agent, for example, a chat bot or other bot. The agent selection software 408 may first determine an agent group associated with the category or sub-category of the purpose of the request (e.g., based on the information associated with the request). The agent selection software 408 may thereafter select an agent from that agent group based on one or more criteria, including agent skill set, agent availability, an agent selection policy (e.g., indicating to rotate in a particular way through a list of available agents), agent review scores, a combination thereof, or the like.

Generally, an agent may belong to one agent group and be able to facilitate requests over one modality. For example, a contact center agent may only be part of an agent group that handles information technology-related requests over the telephony modality. However, in some cases, a given agent may belong to multiple agent groups and/or be able to facilitate requests over one or more modalities. For example, a contact center agent may be part of a first agent group that handles accounting-related requests over all of the telephony, video, chat, text, and social media modalities. In another example, a contact center agent may be part of a first agent group that handles accounting requests over the telephony modality and part of a second agent group that handles information technology-related requests over the video modality. Generally, the agent selected by the agent selection software 408 will automatically be assigned the contact center engagement with the user device 402. However, in some implementations, the agent selection software 408 instead may prompt the selected agent to accept the contact center engagement with the user device 402 before assigning that contact center engagement to the selected agent.

The session handling software 410 establishes a connection between the user device 402 and the agent device 404, which is the device of the agent selected by the agent selection software 408. The particular manner of the connection and the process for establishing same may be based on the modality used for the contact center engagement requested by the user device 402. The contact center engagement is then facilitated over the established connection. For example, facilitating the contact center engagement over the established connection can include enabling the user of the user device 402 and the selected agent associated with the agent device 404 to engage in a discussion over the subject modality to address the purpose of the request from the user device 402. The facilitation of the contact center engagement over the established connection can use communication software implemented in connection with a software platform, for example, one of the software 312 through 318, or like software.

The user device 402 is a device configured to initiate a request for a contact center engagement which may be obtained and processed using the request processing software 406. In some cases, the user device 402 may be a client device, for example, one of the clients 304 through 310 shown in FIG. 3. For example, the user device 402 may use a client application running thereat to initiate the request for the contact center engagement. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center engagements requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
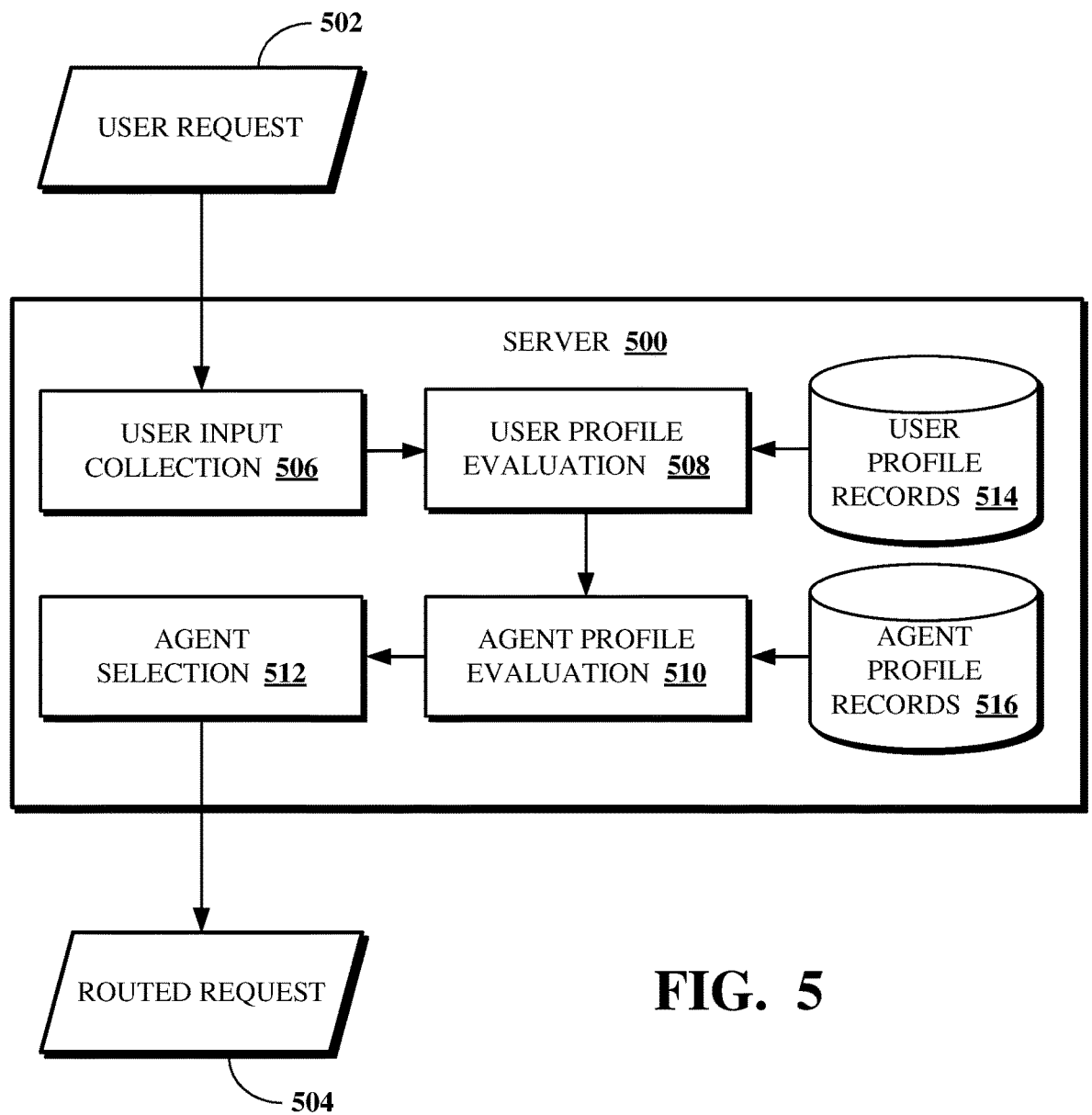
FIG. 5 is a block diagram of an example of a system for profile-based contact center request routing.

FIG. 5 is a block diagram of an example of a system for profile-based contact center request routing. The system includes a server 500 which runs software and stores data for the profile-based contact center request routing. The server 500 obtains a user request 502 for a contact center engagement from a user device (e.g., the user device 402 shown in FIG. 4) and transmits a routed request 504 to establish a connection with a contact center agent device to that contact center agent device (e.g., the agent device 404 shown in FIG. 4). The server 500 runs software including user input collection software 506, user profile evaluation software 508, agent profile evaluation software 510, and agent selection software 512. The server 500 may, for example, be a server of or otherwise used by a contact center, such as the contact center 400 shown in FIG. 4. For example, the user input collection software 506, the user profile evaluation software 508, and the agent profile evaluation software 510 may be or be included in the request processing software 406 shown in FIG. 4. In another example, the agent selection software 512 may be or be included in the operator selection software 408 shown in FIG. 4.

The user input collection software 506 obtains user input associated with the user request 502, which may also be referred to as a contact center engagement request. Subject to the particular modality associated with the user request 502, the user input collection software 506 can use one or more of an IVR menu system, a web form or series of web forms, a prompt for spoken or typed language, or the like to obtain the user input from the user device. The user input collection software 506 may be implemented as a first or otherwise early part of the contact center engagement process. For example, the initial prompts presented to the user device responsive to the user request 502 being received by the contact center system (e.g., at the server 500) may be presented to the user device by the user input collection software 506. Alternatively, the user input collection software 506 may be or otherwise represent a software process used to obtain user input provided from the user device in response to prompting by another software process. In some implementations, the prompts presented to the user device based on the user request 502 may be selected based on the user request 502 and/or information associated with the user device. Implementations and examples for prompt selection for contact center request routing are described below with respect to FIG. 6.

The user profile evaluation software 508 evaluates the user input obtained using the user input collection software 506 against a user profile associated with the user device to determine a prioritization score for the user of the user device. In particular, the user profile evaluation software 508 accesses a user profile records data store 514 which stores records associated with user profiles for the contact center to obtain a user profile associated with the user device. The server 500 may include, store, or otherwise have access to the user profile records data store 514. The user profile evaluation software 508 processes the user profile accessed from the user profile records data store 514 to determine the prioritization score based on one or more of information within the user profile, the user input obtained using the user input collection software 506, or other information obtained from the contact center system or from a system external to the contact center.

A user profile includes or otherwise represents information associated with the user of the user device as a contact center user. Examples of information which may be included or otherwise represented within a user profile include priority status information, engagement number information, engagement resolution information, contact center journey statistics, and the like. The priority status information may, for example, indicate whether the user or an entity associated therewith is a VIP of the contact center. The engagement number information may, for example, indicate a number of total contact center engagements the user has had over some recent period of time (e.g., one day, one week, or one month) and/or whether such a number of total contact center engagements is higher than a threshold number of engagements. The engagement number information may alternatively or additionally indicate a number of attempted contact center engagements of the user (e.g., engagements for which a user request is obtained but connection with an agent is not established, such as where the user disconnects from the engagement while in queue) and/or whether a number of such attempted contact center engagements is higher than a threshold number of attempted engagements.

The engagement resolution information may, for example, indicate a number or percentage of contact center engagements the user has had which either were not resolved on a first attempt or at any time to date. The contact center journey statistics may, for example, indicate information about one or more recent contact center engagements of the user, such as a number of times the user was passed between agents during a most recent contact center engagement, customer satisfaction survey responses provided by or for the user, and the like.

The information associated with a user profile can be supplemented at the time of the user profile evaluation or prior thereto (e.g., based on the user request 502) using external information obtained by the contact center system. For example, a customer relationship management (CRM) system operated external to the contact center may in some cases be used by the contact center customer for which the contact center is implemented, and thus for the user of the user device. The external CRM system can be linked to the contact center system to allow information about recent purchases by a given contact center user to be populated within the user profile for that user. In some implementations, the contact center may include a CRM system used to partially or wholly populate one or more user profiles accessible from the user profile records data store 514. For example, the CRM system may be implemented on the server 500 or another server accessible by the server 500. In some such implementations, the CRM system may be implemented by or using a software platform associated with the contact center, for example, a UCaaS platform.

Privacy policies may in some cases be defined by or for users of a contact center (e.g., by an entity which subscribes to services of the contact center for use by the entity's employees and/or customers as the users) to control the retention of some or all information within a user profile. For example, a privacy policy may require that some or all user profile information be purged at the close of business each day or otherwise within one day of such information being recorded. In another example, the application of a privacy policy may be limited to information usable to uniquely identify a contact center user, such as information associated with user identities, user devices, and the like.

The prioritization score determined by the user profile evaluation software 508 may be determined based on some or all of the information described above. In some cases, information may be weighted based on the relative values thereof. For example, priority status information indicating that the user of the user device is a VIP, individually or in combination with contact center journey statistics indicating a number of times the user was passed between agents during a recent engagement, may be weighted more heavily than engagement number information indicating that the user of the user device is a frequent contact center user. In another example, engagement number information indicating that the user of the user device is a frequent contact center user based on the threshold number of engagements being met may be weighted the same as or more heavily than priority status information. The various examples are numerous and the specific manner by which the prioritization score is determined using individual ones of the above information or combinations thereof is not limited hereby.

The user profile evaluation software 508 determines the prioritization score for the user to indicate a degree to which to prioritize the routing of the user request 502. The routing of the user request 502 may be prioritized by one or more of placing the user request 502 in a queue ahead of others which came before it and which are of lower priority, determining to route the user request 502 to an agent group or another subset of contact center agents deployed specifically for high priority user requests (e.g., generally or within a subject agent group), and determining language (e.g., in the form of a designated script) for the agent to ultimately be selected to handle the user request 502 to use once the agent device of that agent and the user device are connected via the routed request 504.

The agent profile evaluation software 510 evaluates the prioritization score determined by the user profile evaluation software 508 against agent profiles associated with contact center agents (e.g., of a single agent group or of multiple agent groups) to determine one or more candidate agents suitable to handle the user request 502. In particular, the agent profile evaluation software 510 accesses an agent profile records data store 516 which stores records associated with agent profiles for the contact center to obtain one or more agent profiles. The server 500 may include, store, or otherwise have access to the agent profile records data store 516. The agent profile evaluation software 510 processes the agent profiles accessed from the agent profile records data store 516 to determine the one or more candidate agents based on one or more of information within one or more of the accessed user profiles, the prioritization score determined for the subject contact center user, or other information obtained from the contact center system or from a system external to the contact center.

An agent profile includes or otherwise represents information associated with a contact center agent. Examples of information which may be included or otherwise represented within an agent profile include skill information, language information, location information, agent history information, and the like. The skill information may, for example, include a list of categories or sub-categories of customer support that the subject agent is skilled at and, in some cases, a proficiency of the agent in each such skill. The language information may, for example, include a list of languages spoken by the agent and, in some cases, a proficiency of the agent in each such language. The location information may, for example, include a geographic location of the agent and/or a geographic region serviced by the agent. The agent history information may, for example, include evaluations of past contact center engagements involving the agent such as to indicate proficiencies (e.g., in skills and languages), customer satisfaction survey responses, supervisor reports, a number of user requests handled and/or resolved by the agent, mentions of praises and/or citations, agent groups to which the agent currently belongs or has previously belonged, and the like. In some implementations, one or more types of information within an agent profile may be defined to correspond to one of multiple ranges for the type of information. For example, value ranges may be defined for some or all types of information within an agent profile (e.g., based on empirical modeling of multiple contact center agents) to represent how the agent associated with the agent profile compares in one or more areas to other agents of the contact center. In some implementations, an agent profile may include information The one or more candidate agents are agents who meet criteria corresponding to the prioritization score determined for the user request 502. As such, each of the candidate agents may be considered to be a reasonable match for the user request 502 and thus for the user of the user device. Determining the one or more candidate agents by evaluating the prioritization score against the one or more agent profiles accessed within the agent profile records data store 516 may include determining, for each agent associated with one of those agent profiles, a degree to which the agent information represented in the agent profile matches information associated with the user request 502. For example, the prioritization score may correspond to one of multiple prioritization ranges for user requests. Where multiple items of the agent information match the corresponding information associated with the user request 502, the agent may be determined to be a candidate agent. Where only one item or no items of the agent information match the corresponding information associated with the user request 502, the agent may not be determined to be a candidate agent. For example, where the user request 502 is for a troubleshooting question on a specific software service and the user is in North America, an agent may be determined to be a candidate where his or her skills include the specific software service and he or she is deployed to service the North American region of contact center users. However, another agent who has a low proficiency at that software service or who is deployed for a different region may not be determined to be a candidate agent.

Alternatively, determining the one or more candidate agents by evaluating the prioritization score against the one or more agent profiles accessed within the agent profile records data store 516 may include determining a score for each agent associated with the agent profiles and then comparing that score against the prioritization score. The score for an agent may be determined by comparing the agent information within the subject agent profile against the information associated with the user request 502, such as described above. There may be multiple score ranges for user request prioritization scores. For example, where the agent score falls within a topmost range, the agent may be determined as a candidate agent. In another example, where the agent score falls within a bottommost range, the agent may not be determined as a candidate agent.

The agent selection software 512 selects an agent to handle the user request 502 from amongst the candidate agents determined using the agent profile evaluation software 510. The agent can be selected from amongst the candidate agents according to an agent selection policy defined for the contact center as a whole or for an agent group to which the agent corresponds. For example, the agent selection policy may indicate a distribution approach for rotating or otherwise iterating through some or all agents of the agent group to which the agent corresponds. Examples of agent selection policies include longest idle distributions, sequential distributions, and rotating distributions. In some such cases, the agent selection software 512 may select the agent by determining the agent of the candidate agents which is next available for a contact center engagement according to such an agent selection policy.

The agent selection software 512 outputs the routed request 504 to an agent device (e.g., the agent device 404) of the selected agent to establish a connection between the agent device and the user device from which the user request 502 is obtained. For example, the routed request 504 can be used to establish a connection, such as over a private session, between the agent device and the user device, and the established connection can be used to facilitate the contact center engagement associated with the user request 502, such as described with respect to the session handling software 410 shown in FIG. 4.

In some implementations, the agent selected to handle the user request 502 by the agent selection software 512 may be prompted to accept or decline the user request 502 prior to the routed request 504 being output. For example, when declining the user request 502, the agent may be able to indicate a different agent or agent group which would be better suited for the user request 502. In some such implementations, the agent profile evaluation software 510 may access an agent profile associated with that indicated agent or multiple agent profiles associated with that indicated agent group, and the processing described above for agent profile evaluation and agent selection may thus repeat. In some such implementations, where a machine learning model is used for some or all of the profile evaluation and request routing processing, information associated with the different agent or agent group may be used to train the machine learning model for learning how to route similar user requests in the future. Implementations and examples of re-routing a contact center request are described below with respect to FIG. 7.

In some implementations, one or more of the software 506 through 512 may be omitted. For example, the user input collection software 506 may be omitted. In such a case, the user profile evaluation software 508 may perform the user input obtaining described above with respect to the user input collection software 506, or the user request 502 may instead include the user input. In another example, the agent selection software 512 may be omitted. In such a case, the agent profile evaluation software 510 may perform the agent selection described above with respect to the agent selection software 512. In yet another example, the user profile evaluation software 508 and the agent profile evaluation software 510 may be combined into a single software process. In some implementations, the order in which processing occurs with respect to the software 506 through 512 may differ from what is described above. For example, the user profile evaluation performed using the user profile evaluation software 508 may be performed concurrently with, substantially concurrently with, or after the agent profile evaluation performed using the agent profile evaluation software 510.

Although each of the software 506 through 512 and the data stores 514 through 516 are shown as being on the server 500, in some implementations, multiple servers may be used for the software 506 through 512 and/or for the data stores 514 through 516. For example, a first server (e.g., an application server, such as the application server 108 shown in FIG. 1) may run the software 506 through 512 and a second server (e.g., a database server, such as the database server 110 shown in FIG. 1) may include the data stores 514 through 516. In another example, a first server may run the software 506 and 508 and include the data store 514 and a second server may run the software 510 and 512 and include the data store 516.

Figure 6:
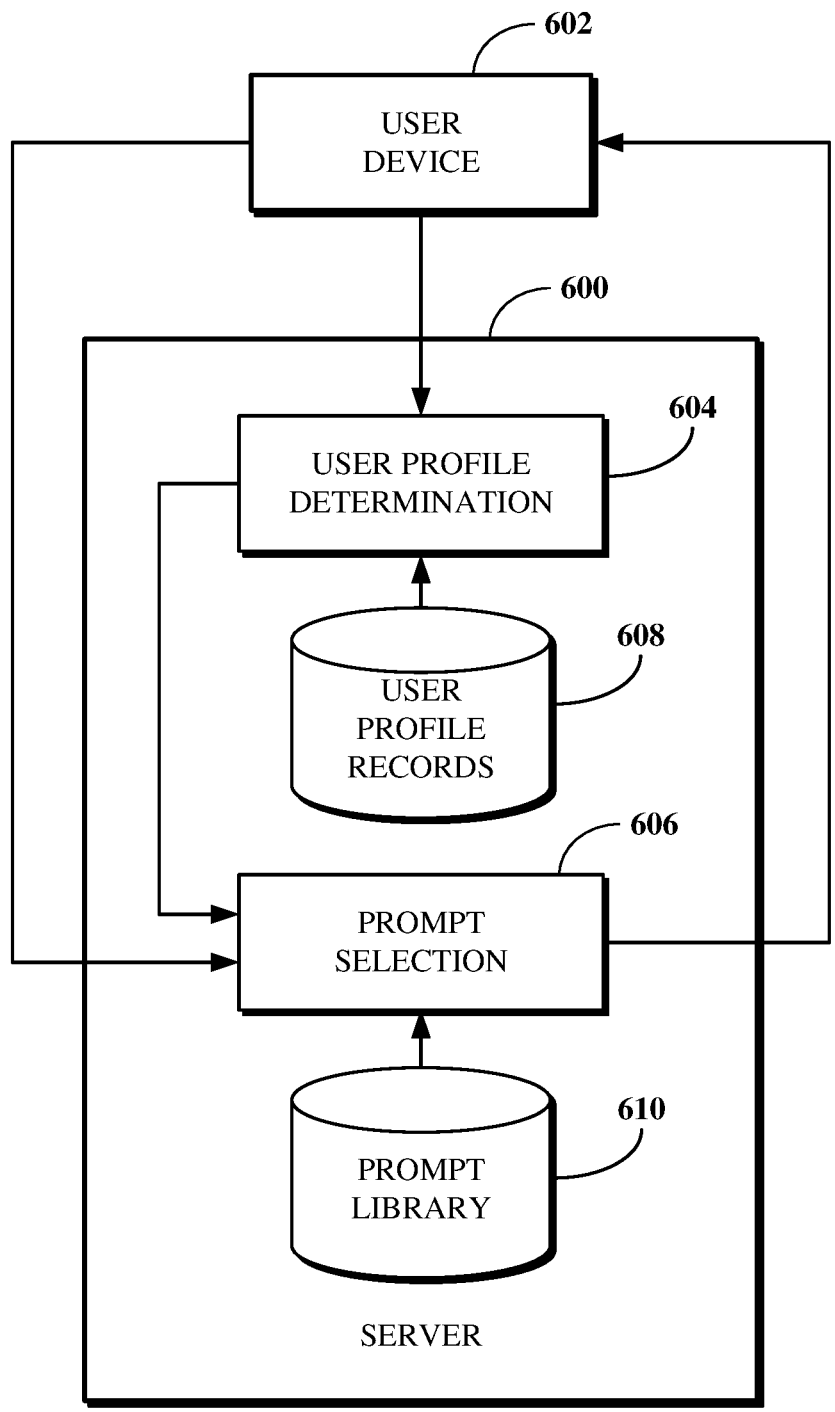
FIG. 6 is a block diagram of an example of prompt selection for contact center request routing.

FIG. 6 is a block diagram of an example of prompt selection for contact center request routing. A typical contact center system presents the same prompts to all user devices. For example, all contact center users who call into a typical contact center system over telephony may be presented with the exact same IVR menu prompts. However, the routing of a user request may be more efficiently handled by the presentation of customized prompts selected specifically for a given user request, user device, user, combination thereof, or the like. The implementations of this disclosure accordingly include customizing the prompts presented to a user device by a contact center system including selecting prompts usable for contact center request routing based on, for example, input obtained in connection with a user request, information associated with a user profile, or both. In particular, the presentation of prompts selected based on user data may improve contact center request routing by more accurately directing the contact center user himself or herself to, with greater accuracy, identify a specific area desired for customer support.

As shown, a server 600, which may, for example, be the server 500 shown in FIG. 5, includes software for selecting prompts to present to a contact center user, such as a user of a user device 602 (e.g., the user device 402 shown in FIG. 4) based on input obtained from the user device 602 and/or information associated with a user profile record for the user of the user device 602. In particular, the server 600 includes user profile determination software 604 and prompt selection software 606. The server 600 also includes a user profile records data store 608 and a prompt library data store 610. The user profile records data store 608 may, for example, be the user profile records data store 514 shown in FIG. 5. In some implementations, one or both of the user profile records data store 608 or the prompt library data store 610 may be at one or more different servers accessible by the server 600.

The prompt selection software 606 selects the prompts to present to the user device 602 as part of the processing for routing a user request (e.g., the user request 502 shown in FIG. 5). The prompts selected using the prompt selection software 606 correspond to options which may be interacted with in some way by the user of the user device 602 subject to the modality over which the user request is received. For example, where the user request is received over the telephony modality, the prompts may correspond to IVR menu options selectable by the user of the user device 602 using physical or virtual keypad elements, voice response, or other means. In another example, where the user request is received over the video modality, the prompts may correspond to visual form options presented within a software user interface (e.g., in a portion where a video stream from an agent device may otherwise be rendered) for selection using a mouse or touchscreen of the user device 602.

The prompt selection software 606 may in some cases select the prompts to present to the user device 602 based on input obtained from the user device 602 (e.g., without reference to a user profile record associated with the user device 602). For example, the input may correspond to input obtained using the user input collection software 506 shown in FIG. 5. In some implementations, the prompt selection software 606 may be included in the user input collection software 506. In some implementations, the prompt selection software 606 may include the user input collection software 506. The prompt selection software 606 may in other cases select the prompts to present to the user device 602 based on information associated with a user profile record for the user device 602 (e.g., without reference to input obtained from the user device 602). For example, a user profile record for the user device 602 may be identified and accessed within the user profile records data store 608 by the user profile determination software 604. The identification of the user profile record for the user device 602 by the user profile determination software 604 may correspond to the identification of user profile records by the user profile evaluation software 508 shown in FIG. 5. In some implementations, the user profile determination software 604 may be included in the user profile evaluation software 508. In some implementations, the user profile determination software 604 may include the user profile evaluation software 508. The prompt selection software 606 may in still further cases select the prompts to present to the user device 602 based on both input obtained from the user device 602 and information associated with a user profile record for the user device 602.

In any such case, the prompt selection software 606 may use a mapping defined for certain types of user data to certain types of prompts to select the prompts for presentation to the user device 602. Alternatively, the prompt selection software 606 may use or otherwise access a machine learning model trained to recommend prompts for presentation to the user device 602. For example, the prompt selection software 606 may provide, as input to the machine learning model, one or both of input obtained from the user device 602 or information associated with a user profile record for the user device 602. The prompt selection software 606 may thus receive, as output from the machine learning model, indications of the prompts to select for presentation to the user device 602. In some implementations, the prompt selection software 606 may include the machine learning model.

In one example use case, the machine learning model may be trained based on information specific to the user of the user device 602, an entity associated with that user, or multiple contact center users or entities. The machine learning model processes the relevant input information to determine candidate agent groups which may be usable to handle a subject user request. For example, the machine learning model can be a machine learning model of or used by agent profile evaluation software, such as the agent profile evaluation software 510 shown in FIG. 5, to determine one or more candidates for the user request. The machine learning model may determine to recommend prompts associated with the candidate agent groups for presentation to the user device 602. For example, where input obtained in connection with the user request indicates that the user request is for billing support and user profile information associated with the user device 602 indicates that the user of the user device uses certain billing software and has recently engaged the contact center to address an invoice generation error for the billing software, the machine learning model can process that user data to recommend a first prompt associated with an agent group that handles general billing-related customer support matters, a second prompt associated with an agent group that handles customer support matters generally related to the particular billing software, and a third prompt associated with an agent group that handles specific information technology-related customer support matters for the particular billing software.

The prompts selected by the prompt selection software 606 may be selected from the prompt library data store 610, which is a data store that stores data associated with prompts available for presentation to contact center users. The prompts represented by the data of the prompt library data store 610 may be added to the prompt library data store 610 by manual user input, machine learning processing of user data (e.g., inferred relationships between frequently accessed prompts and obtained user input and/or user profile information), or the like. For example, the prompt selection software 606 may use or otherwise access a machine learning model trained to recommend prompts to include in the prompt library data store 610. In particular, the machine learning model may be trained to recommend prompts based on the processing of contact center interaction data, such as recordings or transcriptions of whole or partial conversations between contact center users and contact center agents, to determine situations in which a contact center user was not initially routed to the correct agent. In such a case, the machine learning model can correlate the prompts selected by the contact center user and information associated with the user request against the incorrect initial agent routing to determine a new prompt to recommend for entry within the prompt library data store 610. In some implementations, the prompt selection software 606 may include the machine learning model. In some implementations, the machine learning model disclosed herein for recommending prompts may be the same as the machine learning model disclosed above for determining prompts to present to the user device 602.

Figure 7:
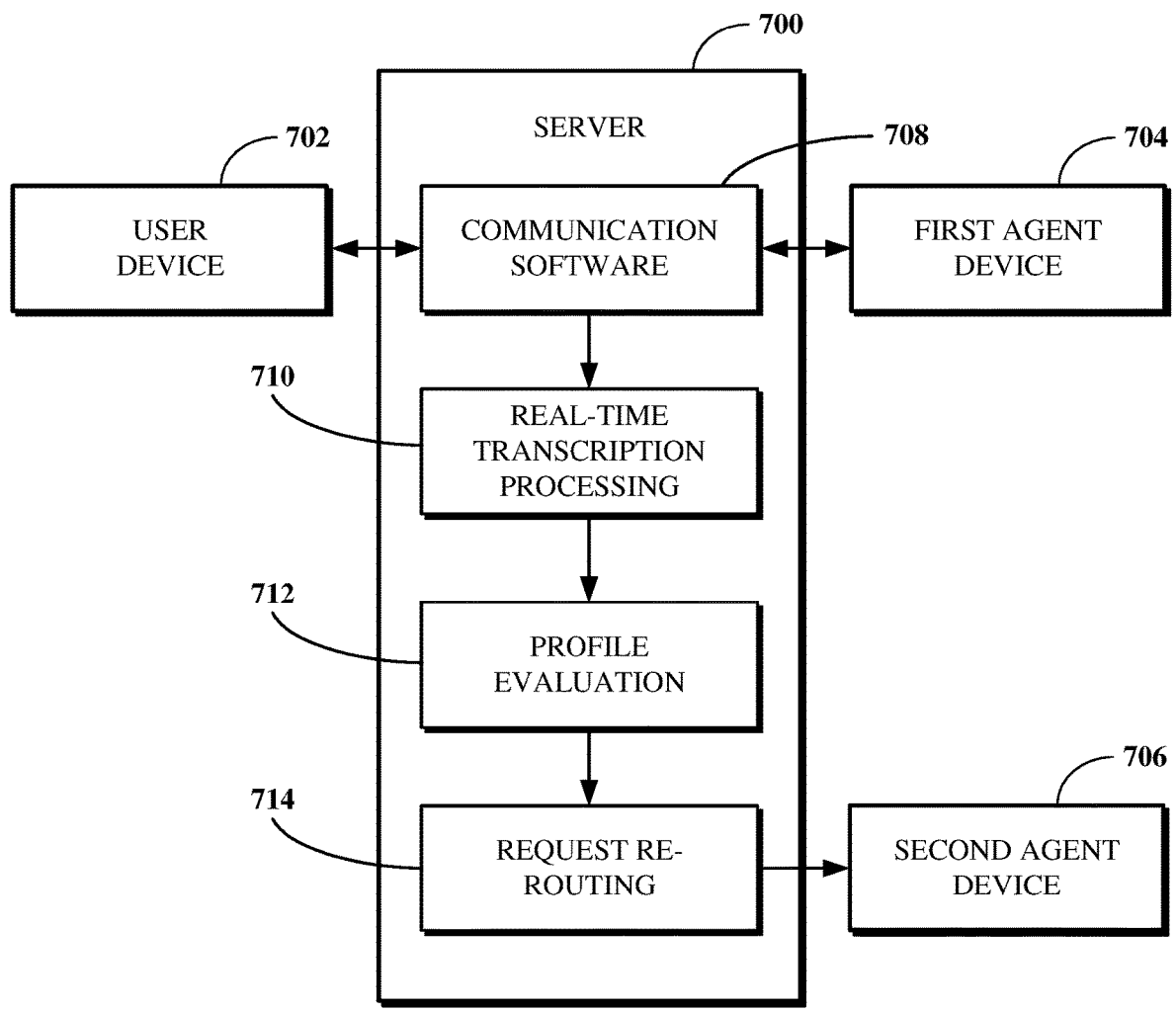
FIG. 7 is a block diagram of an example of re-routing a contact center request.

FIG. 7 is a block diagram of an example of re-routing a contact center request. A typical contact center system relies on contact center user and/or contact center agent manual decision making to initiate a re-routing of a contact center request from a current agent to a different agent. For example, with typical contact center systems, a user must first make it to an agent (e.g., after spending time going through the initial routing process and other time waiting in a queue) before the user and/or the agent determines that the agent is not the right agent to handle the subject user request, such as because a different agent group is deployed for the types of customer support matters underlying the user request. The user in such a case must then spend more time waiting to be connected to the new agent and runs the risk of the new agent still being not right to handle the subject user request, such as due to incorrect judgment or a misunderstanding by the initial agent. The implementations of this disclosure accordingly include automated processing of contact center engagement data for a current engagement between a user and an agent to quickly and accurately determine a re-routing of a user request.

As shown, a server 700, which may, for example, be the server 500 shown in FIG. 5 or the server 600 shown in FIG. 6, to the extent different, includes software for re-routing a contact center request of a contact center user, such as a user of a user device 602 (e.g., the user device 402 shown in FIG. 4 or the user device 602 shown in FIG. 6, to the extent different) from a first agent device 704 to which the contact center request is initially routed to a second agent device 706. In particular, the server 700 includes communication software 708, real-time transcription processing software 710, profile evaluation software 712, and request re-routing software 714.

The communication software 708 is software used to implement a contact center engagement between the user of the user device 702 and a contact center agent as the user of the first agent device 704. The particular type of communication software 708 used may be based on the modality for the user request resulting in the contact center engagement. For example, where the user request is for a contact center engagement over the telephony modality, the communication software 708 may be telephony software, such as the telephony software 312 shown in FIG. 3. In another example, where the user request is for a contact center engagement over the video modality, the communication software 708 may be conferencing software, such as the conferencing software 314 shown in FIG. 3.

The real-time transcription processing software 710 processes a real-time transcription of the contact center engagement between the user of the user device 702 and the agent as the user of the first agent device 704 for information indicating to re-route the user request. The real-time transcription represents a recording (e.g., in text form) of the conversation between the user of the user device 702 and the agent as the user of the first agent device 702 during the contact center engagement over the communication software 708. For example, the communication software 708 or other software which accesses the communication software 708 can generate the real-time transcription. In another example, the real-time transcription processing software 710 is the other software which accesses the communication software 708 to generate the real-time transcription. The real-time transcription processing software 710 may use or otherwise access a machine learning model trained to recognize conversational elements (e.g., keywords, phrases, and context) which suggest that the agent as the user of the first agent device 704 may not be the proper agent to handle the user request. In some implementations, the real-time transcription processing software 710 includes the machine learning model. Alternatively, the real-time transcription processing software 710 may perform natural language processing against the real-time transcription to identify such conversational elements.

The profile evaluation software 712, based on the processing of the real-time transcription by the real-time transcription processing software 710, evaluates one or both of a user profile record associated with the user device 702 or agent profile records associated with contact center agents other than the agent as the user of the first agent device 704 to determine a different contact center agent to handle the user request—in this case, the different contact center agent being an agent as the user of the second agent device 706. The evaluation of the user profile record and the agent profile records may be similar to or the same as the evaluation of user profiles and agent profiles as disclosed above with respect to the user profile evaluation software 508 and the agent profile evaluation software 510 shown in FIG. 5. In some implementations, the profile evaluation software 712 may be or include the user profile evaluation software 508 and the agent profile evaluation software 510.

The request re-routing software 714 re-routes the user request from the first agent device 704 to the second agent device 706 based on the determination of the agent associated with the second agent device 706 by the profile evaluation software 712. For example, re-routing the user request from the first agent device 704 to the second agent device 706 can include disconnecting the user device 702 from the first agent device 704, such as by closing a private session established between the user device 702 and the first agent device 704 (e.g., over the communication software 708) and establishing a new private session between the user device 702 and the second agent device 706 to connect those devices. In particular, the disconnection and connection of devices as performed or otherwise caused by the request re-routing software 714 may be performed similar to or the same as is disclosed with respect to the session handling software 410 shown in FIG. 4.

In one example use case, the user of the user device 702 may be connected with the agent associated with the first agent device 704 based on an initial routing of a user request from the user device 702 as disclosed herein. At the beginning of the engagement between the user and the agent, the user may start to explain the customer support matter for which he or she has reached out to the contact center. A real-time transcription of the engagement can capture the speech, text, or other representative input from the user device 702 and process same against an agent profile record associated with the agent to determine that the agent is actually not the best fit for the user request, such as while the user continues to explain the customer support matter or shortly thereafter. A different agent is resultingly identified to handle the user request, and the agent briefly explains that he or she understands the customer support matter and that the different agent will be better suited to address it with the user. The contact center system accordingly re-routes the user request to an agent device associated with the different agent to enable the user and the different agent to engage in a conversation regarding the user request.

Figure 8:
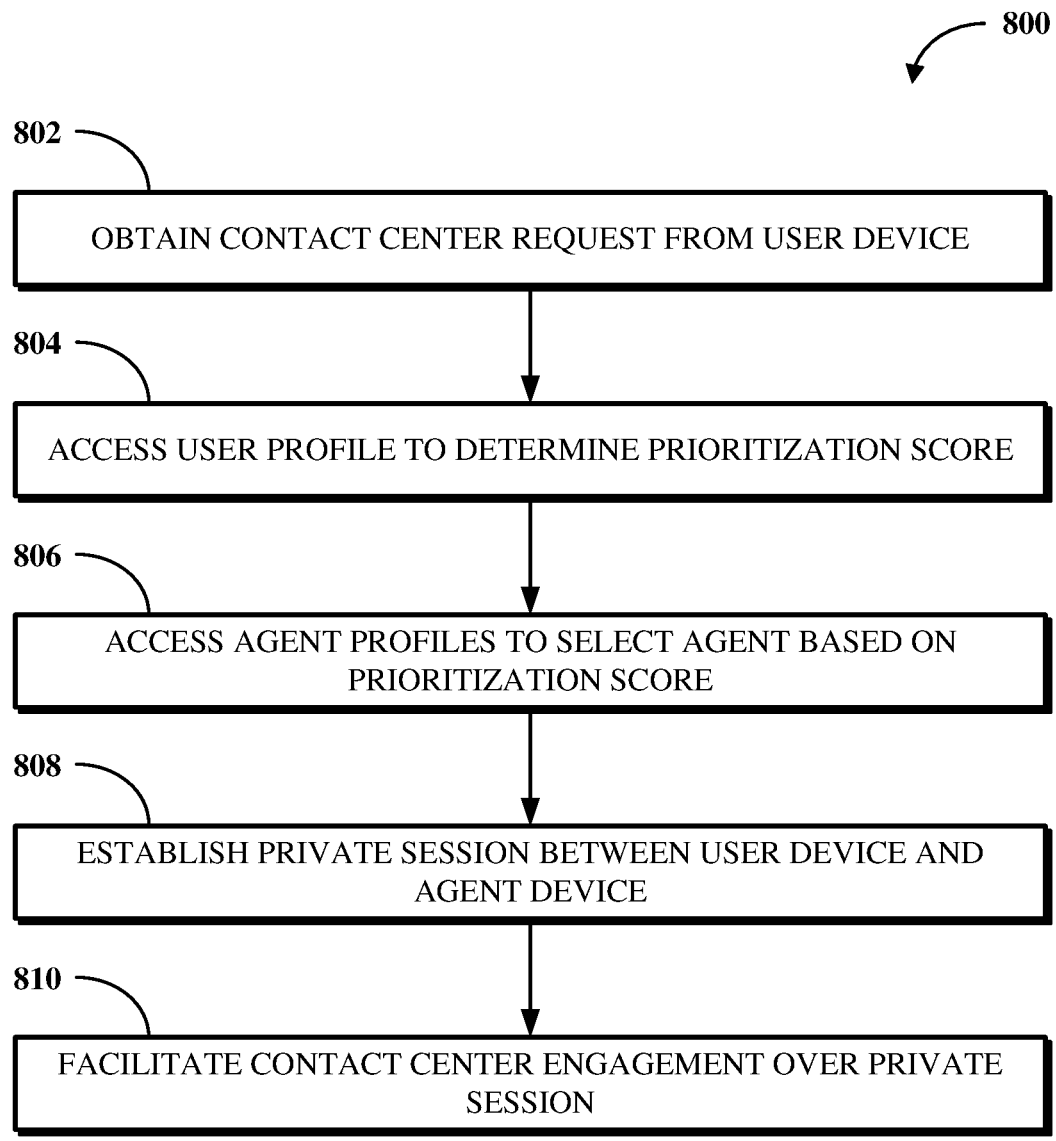
FIG. 8 is a flowchart of an example of a technique for profile-based contact center request routing.

To further describe some implementations in greater detail, reference is next made to examples of techniques which may be performed by or using a system for profile-based contact center request routing. FIG. 8 is a flowchart of an example of a technique 800 for profile-based contact center request routing. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a user request, also referred to as a contact center engagement request, is obtained from a user device. The contact center engagement request may be obtained based on an initiation of a communication between the user device and a contact center system used for facilitating the contact center engagement request, such as a server of the contact center system. In some implementations, obtaining the contact center engagement request from the user device can include obtaining user input associated with the contact center engagement request from the user device. For example, the user input may be obtained based on selections at the user device of one or more prompts presented to the user device and/or based on other responses to those one or more prompts.

At 804, responsive to the contact center engagement request, a user profile associated with the user device is accessed to determine a prioritization score. The user profile is accessed within a user profile record stored by or for the contact center system. The user profile includes information associated with at least one of a priority status of the user, a number of past contact center engagements involving the user, a number of times the user was passed between agents during one or more of the past contact center engagements, or a percentage of the past contact center engagements remaining unresolved. The prioritization score is determined for the contact center engagement request based on information associated with the user profile. In some cases, the prioritization score may further be determined based on the obtained user input. Determining the prioritization score can include weighting certain information of the user profile and/or of the user input. For example, the prioritization score may be determined using a first weight applied to first information associated with the user profile and a second weight applied to second information associated with the user profile, in which the first weight and the second weight may be different. In some implementations, the user profile includes information obtained from an external system (e.g., an external CRM system). For example, the information from the external system can be obtained responsive to the contact center engagement request. In another example, the information from the external system can be obtained prior to the contact center engagement request. In some implementations, the user profile may be partially or wholly generated using an integration between a contact center system and the external system.

At 806, agent profiles are accessed to determine an agent to support the contact center engagement request based on the prioritization score. The agent profiles are associated with contact center agents and/or agent groups. An agent profile associated with an agent includes information associated with at least one of a skill set of the agent, a list of languages spoken by the agent, a geographical location of the agent, or agent history information of the agent. Accessing the agent profiles to determine the agent to support the contact center engagement request based on the prioritization score may include determining one or more candidate agents based on the prioritization score and information associated with at least one of the contact center engagement request or the user profile, and selecting, as the agent, one of the one or more candidate agents based on an agent selection policy. For example, the agent selection policy may define a rotation of agents of an agent group for handling requests. Alternatively, accessing the agent profiles to determine the agent to support the contact center engagement request based on the prioritization score may include determining, based on the user profile, a priority status of the user; determining, based on the user profile, a recent contact center engagement history for the user; and determining the prioritization score based on the priority status and the recent contact center engagement history.

At 808, a private session is established between the user device and a device of the agent (e.g., an agent device). Establishing the private session can include opening channels between communication software to use for the contact center engagement and each of the user device and the device of the agent. At 810, a contact center engagement is facilitated over the private session established between the user device and the device of the agent.

In some implementations, the technique 800 may include selecting prompts to present to the user device. For example, the prompt selection may be performed in response to the obtaining of the contact center engagement request, such as prior to the obtaining of user input from the user device in connection with the contact center engagement request. In another example, the prompt selection may be performed based on user input obtained from the user device in connection with the contact center engagement request. In some implementations, the technique 800 may include selecting prompts to present to the user device based on the contact center engagement request, and obtaining user input indicating a selection of one of the prompts from the user device, in which the prioritization score is determined based on information associated with the user profile and the user input. In some implementations, the technique 800 may include selecting, from a prompt library, prompts to present to the user device based on the contact center engagement request, in which at least one of the prompts is added to the prompt library prior to the contact center engagement request based on output of a machine learning model trained based on past contact center engagements. In some implementations, the technique 800 may include using a machine learning model trained to determine prompts for presentation to the user device based on at least one of input obtained from the user device or information associated with the user profile, in which the agent profiles are accessed based on a selection of one of the prompts at the user device.

In some implementations, the technique 800 may include re-routing the contact center engagement request from the agent device to which the contact center engagement request was initially routed to a different agent device. For example, a determination to re-route the contact center engagement request may be made at a beginning of a conversation between the user and the agent over the private session or at another time during the conversation. In some implementations, the technique 800 may include terminating the private session responsive to determining, during the private session, information indicating to re-route the contact center engagement request to a device of a different agent, and establishing a new private session between the user device and the device of the different agent. In some implementations, the re-routing can be based on a processing of a real-time transcription of a conversation between a user of the user device and the agent during the private session.

The implementations of this disclosure correspond to methods, non-transitory computer readable media, apparatuses, systems, devices, and the like. In some implementations, a method comprises, responsive to a contact center engagement request from a user device, accessing a user profile associated with the user device to determine a prioritization score; accessing agent profiles to determine an agent to support the contact center engagement request based on the prioritization score; and establishing a private session between the user device and a device of the agent. In some implementations, a non-transitory computer readable medium stores instructions operable to cause one or more processors to perform operations comprising, responsive to a contact center engagement request from a user device, accessing a user profile associated with the user device to determine a prioritization score; accessing agent profiles to determine an agent to support the contact center engagement request based on the prioritization score; and establishing a private session between the user device and a device of the agent. In some implementations, an apparatus comprises a memory and a processor configured to execute instructions stored in the memory to, responsive to a contact center engagement request from a user device, access a user profile associated with the user device to determine a prioritization score; access agent profiles to determine an agent to support the contact center engagement request based on the prioritization score; and establish a private session between the user device and a device of the agent.

In some implementations of the method, non-transitory computer readable medium, or apparatus, user input is obtained from the user device based on the contact center engagement request, wherein the prioritization score is determined based on information associated with the user profile and the user input.

In some implementations of the method, non-transitory computer readable medium, or apparatus, prompts to present to the user device are selected based on the contact center engagement request; and user input indicating a selection of one of the prompts is obtained from the user device, wherein the prioritization score is determined based on information associated with the user profile and the user input.

In some implementations of the method, non-transitory computer readable medium, or apparatus, accessing the agent profiles to determine the agent to support the contact center engagement request based on the prioritization score comprises determining one or more candidate agents based on the prioritization score and information associated with at least one of the contact center engagement request or the user profile; and selecting, as the agent, one of the one or more candidate agents based on an agent selection policy.

In some implementations of the method, non-transitory computer readable medium, or apparatus, the user profile includes information obtained from an external customer relationship management system responsive to the contact center engagement request.

In some implementations of the method, non-transitory computer readable medium, or apparatus, the user profile includes information obtained from an external system prior to the contact center engagement request.

In some implementations of the method, non-transitory computer readable medium, or apparatus, the private session is terminated responsive to determining, during the private session, information indicating to re-route the contact center engagement request to a device of a different agent; and a new private session is established between the user device and the device of the different agent.

In some implementations of the method, non-transitory computer readable medium, or apparatus, the user profile includes information associated with at least one of a priority status of the user, a number of past contact center engagements involving the user, a number of times the user was passed between agents during one or more of the past contact center engagements, or a percentage of the past contact center engagements remaining unresolved.

In some implementations of the method, non-transitory computer readable medium, or apparatus, an agent profile associated with the agent includes information associated with at least one of a skill set of the agent, a list of languages spoken by the agent, a geographical location of the agent, or agent history information of the agent.

In some implementations of the method, non-transitory computer readable medium, or apparatus, accessing the user profile to determine the prioritization score comprises determining, based on the user profile, a priority status of the user; determining, based on the user profile, a recent contact center engagement history for the user; and determining the prioritization score based on the priority status and the recent contact center engagement history.

In some implementations of the method, non-transitory computer readable medium, or apparatus, a machine learning model trained to determine prompts for presentation to the user device based on at least one of input obtained from the user device or information associated with the user profile is used, wherein the agent profiles are accessed based on a selection of one of the prompts at the user device.

In some implementations of the method, non-transitory computer readable medium, or apparatus, the contact center engagement request is re-routed to a device of a different agent based on a processing of a real-time transcription of a conversation between a user of the user device and the agent during the private session.

In some implementations of the method, non-transitory computer readable medium, or apparatus, accessing the agent profiles to determine the agent to support the contact center engagement request based on the prioritization score comprises selecting the agent from amongst one or more candidate agents determined based on the prioritization score and information associated with at least one of the contact center engagement request or the user profile.

In some implementations of the method, non-transitory computer readable medium, or apparatus, prompts from a prompt library are selected to present to the user device based on the contact center engagement request, wherein at least one of the prompts is added to the prompt library prior to the contact center engagement request based on output of a machine learning model trained based on past contact center engagements.

In some implementations of the method, non-transitory computer readable medium, or apparatus, the user profile is generated using an integration between a contact center system and an external customer relationship management system.

In some implementations of the method, non-transitory computer readable medium, or apparatus, a determination is made, during the private session, to re-route the contact center engagement request to a different agent; and a new private session is established between the user device and a device of the different agent.

In some implementations of the method, non-transitory computer readable medium, or apparatus, the prioritization score is determined using a first weight applied to first information associated with the user profile and a second weight applied to second information associated with the user profile, wherein the first weight and the second weight are different.

In some implementations of the method, non-transitory computer readable medium, or apparatus, the agent is further determined based on an agent selection policy defining a rotation of agents of an agent group for handling requests.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   determining, based on a contact center engagement history for a contact center user initiating a request, a score for the contact center user;
   determining, based on the score, an agent for the request from amongst a plurality of agents; and
   routing the request to a device associated with the agent.

2. The method of claim 1, wherein determining the score for the contact center user comprises one or more of:
   determining a number of past contact center engagements involving the contact center user;
   determining a number of times the contact center user was passed between agents during one or more of the number of past contact center engagements; or
   determining a percentage of the number of past contact center engagements remaining unresolved.

3. The method of claim 1, wherein determining the score for the contact center user comprises:
   accessing a user profile associated with a contact center processing the request, and
   wherein determining the agent for the request from amongst the plurality of agents comprises:
   accessing an agent profile associated with the agent.

4. The method of claim 1, wherein determining the agent for the request from amongst the plurality of agents comprises:
   determining the agent based on the score and an agent selection policy associated with at least some of the plurality of agents.

5. The method of claim 1, comprising:
   establishing a contact center session between a device associated with the contact center user and the device associated with the agent.

6. The method of claim 1, comprising:
   re-routing the request to a device associated with a different agent of the plurality of agents during a contact center session established between a device associated with the contact center user and the device associated with the agent.

7. The method of claim 1, wherein the score is determined using a first weight applied to first information associated with a user profile of the contact center user and a second weight applied to second information associated with the user profile.

8. The method of claim 1, wherein the request is a request for a contact center session over one of telephony, video, text messaging, chat, or social media.

9. A non-transitory computer readable medium storing instructions operable to cause one or more processors to perform operations comprising:
   determining, based on a contact center engagement history for a contact center user initiating a request, a score for the contact center user;
   determining, based on the score, an agent for the request from amongst a plurality of agents; and
   routing the request to a device associated with the agent.

10. The non-transitory computer readable medium of claim 9, wherein the contact center engagement history corresponds to one or more of a number of past contact center engagements involving the contact center user, a number of times the contact center user was passed between agents during one or more of the number of past contact center engagements, or determining a percentage of the number of past contact center engagements remaining unresolved.

11. The non-transitory computer readable medium of claim 9, wherein the score is determined based on the contact center engagement history and information obtained from an external customer relationship management system.

12. The non-transitory computer readable medium of claim 9, wherein the score is determined based on the contact center engagement history and a priority status of the contact center user.

13. The non-transitory computer readable medium of claim 9, wherein a user profile associated with the contact center user is accessed to determine the score and an agent profile associated with the agent is accessed to determine the agent.

14. A system, comprising:
    one or more memories; and
    one or more processors configured to execute instructions stored in the one or more memories to:
    determine, based on a contact center engagement history for a contact center user initiating a request, a score for the contact center user;
    determine, based on the score, an agent for the request from amongst a plurality of agents; and
    route the request to a device associated with the agent.

15. The system of claim 14, wherein the score is determined by accessing a user profile including information associated with at least one of a priority status of the contact center user, a number of past contact center engagements involving the contact center user, a number of times the contact center user was passed between agents during one or more of the number of past contact center engagements, or a percentage of the number of past contact center engagements remaining unresolved.

16. The system of claim 14, wherein the agent is determined by accessing an agent profile including information associated with at least one of a skill set of the agent, a list of languages spoken by the agent, a geographical location of the agent, or agent history information of the agent.

17. The system of claim 14, wherein the score is determined based on the contact center engagement history and user input obtained from a device associated with the contact center user.

18. The system of claim 14, wherein the score is determined based on the score and one or more of a priority status of the contact center user or information obtained from an external customer relationship management system.

19. The system of claim 14, wherein the request is re-routed during a contact center session established between a device associated with the contact center user and the device associated with the agent to cause a new contact center session to establish between the device associated with the contact center user and a device associated with a different agent.

20. The system of claim 14, wherein the agent is determined based on the score and an agent selection policy defining a rotation of agents of an agent group for handling requests.

* * * * *